US006636734B1

(12) United States Patent
Berger et al.

(10) Patent No.: US 6,636,734 B1
(45) Date of Patent: Oct. 21, 2003

(54) DUAL RECEIVE GROUND TERMINAL FOR USE IN COMMUNICATION SYSTEMS UTILIZING MULTIPLE SATELLITES

(75) Inventors: Harvey L. Berger, Redondo Beach, CA (US); Dennis A. Nivens, Hermosa Beach, CA (US); Reginald Jue, Manhattan Beach, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

(21) Appl. No.: 09/572,162

(22) Filed: May 17, 2000

(51) Int. Cl.[7] .......................... H04B 7/185; H04Q 7/20
(52) U.S. Cl. ...................... 455/427; 455/12.1; 455/13.1
(58) Field of Search ................................. 455/427, 430, 455/12.1, 13.1

(56) References Cited

U.S. PATENT DOCUMENTS

| | | | |
|---|---|---|---|
| 4,577,330 A | 3/1986 | Kavehrad | |
| 4,644,562 A | 2/1987 | Kavehrad | |
| 5,758,261 A | 5/1998 | Wiedeman | |
| 5,995,832 A | 11/1999 | Mallinckrodt | |
| 6,147,981 A | 11/2000 | Prescott | |
| 6,249,514 B1 | 6/2001 | Campanella | |
| 6,272,317 B1 * | 8/2001 | Houston et al. | 455/13.1 |
| 6,396,819 B1 | 5/2002 | Fleeter | |
| 6,400,925 B1 * | 6/2002 | Tirabassi et al. | 455/12.1 |
| 6,445,685 B1 * | 9/2002 | Carrozza et al. | 370/316 |

* cited by examiner

Primary Examiner—Vivian Chin
Assistant Examiner—Yuwen Pan

(57) ABSTRACT

A ground terminal renders feasible a communications system that locates two satellites at the same node along the geostationary arc. Each satellite is capable of receiving RF signals through an uplink channel and transmitting RF signals through a downlink channel distinct from the uplink channels. The ground terminal is able to transmit RF signals to only one of the satellites, but can receive RF signals from both of the satellites. The ground terminal includes an antenna, an RF signal processor that includes two demodulators for processing signals from the two downlink channels, and a data processor.

9 Claims, 2 Drawing Sheets

DUAL RECEIVE GROUND TERMINAL FOR USE IN COMMUNICATION SYSTEMS UTILIZING MULTIPLE SATELLITES

BACKGROUND OF THE INVENTION

This invention relates generally to satellite-based communication systems, and more particularly to a ground terminal design applicable to satellite-based communication systems having multiple satellites.

Satellite-based communication systems which provide wireless access between separated user terminals on the earth are designed to give users of laptop PCs, handheld computers, and other similar devices very high-speed two-way data links with the Internet, their corporate Intranets, each other, and any other desired network. The service coverage is international, and utilizes high-power satellite transponders that route data from one user terminal to another.

The satellite-based systems presently under consideration include at least two different types of satellite constellations. One type, such as that described as the Teledesic™ or ICO Global systems, provides a plurality of satellites in low-earth or medium-earth orbits, in which satellites enter and exit from view of a user terminal and require handoffs from one satellite to another as the individual satellites traverse into and out of view of a particular user. These handoffs typically occur via intersatellite crosslinks which route incoming data from a user from one satellite to the next. These intersatellite crosslinks are expensive to manufacture, are heavy and thus increase launch costs, take up valuable real estate on the satellite, and consume precious power.

A second type of system, such as that known as Astrolink™, uses satellites in geostationary or geosynchronous orbit (GEO), which essentially are viewed as stationary in the sky by a user on the earth. Satellite handoffs are not necessary in the basic system, since only one satellite is ever in the field of view of the user.

However, in order to provide redundancy and to provide increased capacity, certain GEO systems may utilize two or more satellites in one node along the geostationary arc. This use of multiple satellites at one node can cause a problem, in that the ground terminals transmit and receive to and from only one satellite at a time. Communications between users accessing different satellites must be routed either on intersatellite crosslinks or through a ground-bounce gateway so that user data is routed to the satellite to which the user is connected. Users within a particular geographic region will be divided between the two satellites in the node. As a result, statistically, approximately half the data within a region could be routed between satellites. However, the ground-bounce gateway is an inefficient utilization of system resources. It therefore is desirable to develop user ground terminals which can be used in a satellite-based communication system involving multiple satellites without requiring either intersatellite crosslinks or a double hop through a ground gateway.

SUMMARY OF THE INVENTION

In accordance with the present invention, the aforementioned need in the prior art is met by a communications system which includes two or more satellites each including means for receiving RF signals through an uplink channel and for transmitting RF signals through a downlink channel distinct from said first uplink channel. The system is made feasible by the use of user terminals, each able to transmit RF signals to only one of the satellites, but having the capability to receive RF signals from at least two of the satellites.

BRIEF DESCRIPTION OF THE DRAWINGS

Reference is now made to the Description of the Preferred Embodiments, illustrated in the accompanying drawings, in which.

DESCRIPTION OF THE PREFERRED EMBODIMENTS

Figure 1:
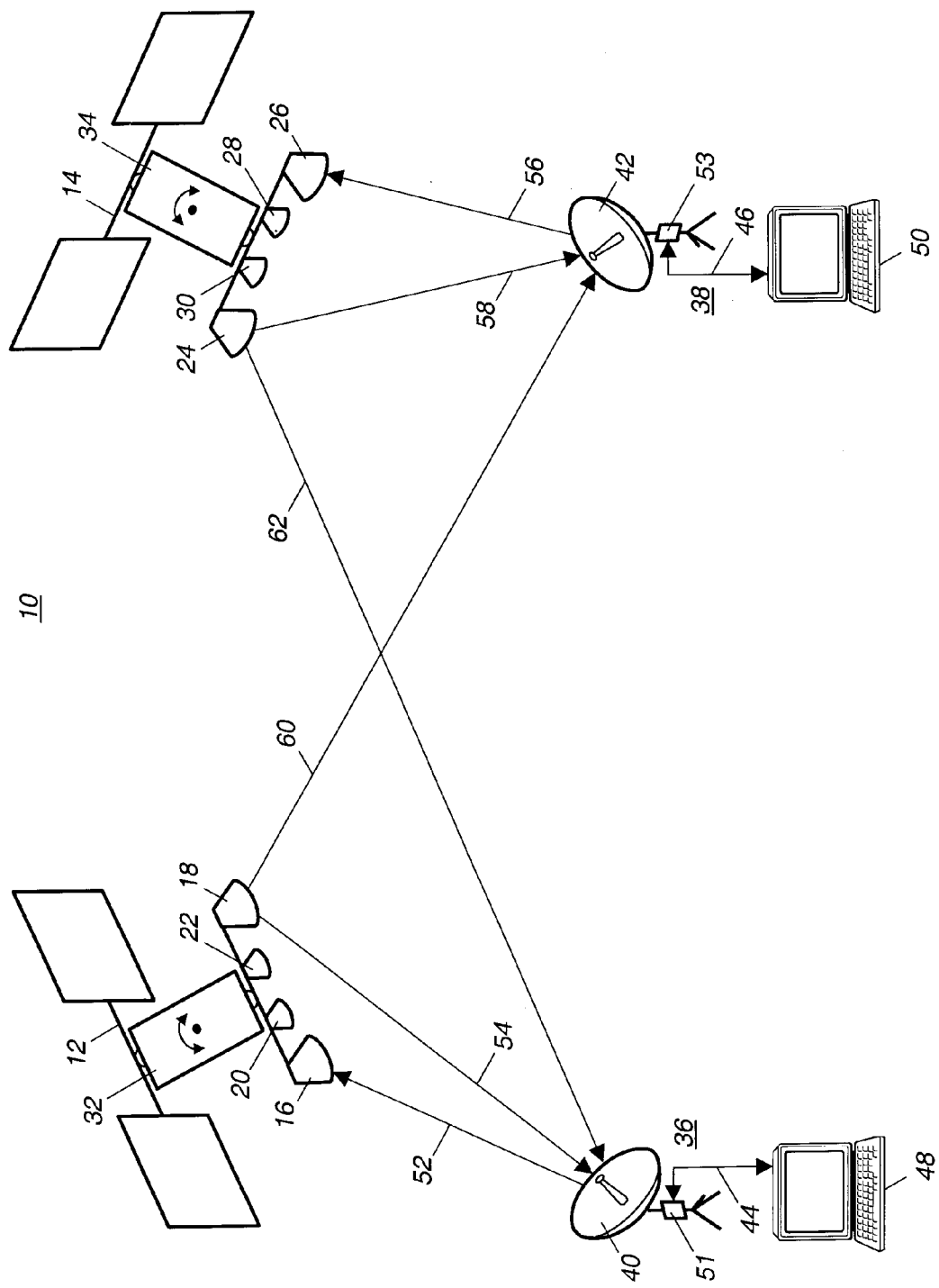
FIG. 1 is a schematic illustration of the principles of a multiple satellite communication system, showing the basic configuration of two satellites and two user terminals.

Referring now more particularly to FIG. 1, therein is shown a communications system 10 illustrating the principles of the invention. The system 10 includes a first orbiting satellite 12 and a second orbiting satellite 14. The satellites 12, 14 are preferably in geostationary orbit approximately 36,000 kilometers above the surface of the earth, and would be located in the same node along the geostationary arc. For example, both satellites could be located at 97° West longitude to provide coverage of the continental United States.

The satellite 12 includes four antennas: a user uplink antenna 16, a user downlink antenna 18, and gateway antennas 20, 22. The second satellite 14 also includes four antennas: the user uplink antenna 26, the user downlink antenna 24, and the two gateway antennas 28, 30. The four antennas shown for each satellite are illustrative. The functionality illustrated by these four antennas can be realized by fewer than four individual physical antennas. For example, transmit and receive functions can be realized by one antenna; and multiple beams can be realized with one antenna with multiple feeds.

Each satellite 12, 14 also includes a payload 32, 34 respectively, which routes incoming RF signals from the uplink antenna 16, 26 to the downlink antenna 18, 24 respectively. The payloads 32, 34 may also provide processing of the incoming RF signals if desired.

On the surface of the earth are two ground or user terminals 36, 38 separated from each other. Each terminal 36, 38 includes a combination transmit/receive antenna 40, 42 respectively which are connected, via the RF signal processors 51, 53 and the signal lines 44, 46 to the processing devices 48, 50, illustrated in the drawings as computer terminals though the invention is likewise applicable to all other devices which can receive and process data. The antennas 40, 42 could be relatively small dishes, on the order of 18 inches in diameter.

The first user terminal 36 would normally be assigned to, and in RF communication with, the first satellite 12, and the second user terminal 38 would normally be assigned to, and in RF communication with, the second satellite 14. The first terminal 36 transmits RF signals to the satellite 12 over the uplink channel 52, and receives RF signals from the satellite 12 over the downlink channel 54. The second terminal 38 transmits RF signals to the satellite 14 over the uplink channel 56, and receives RF signals from the satellite 14 over the downlink channel 58.

In order to avoid interference between uplink channels, the uplink channel 52 for the first satellite 12 is distinct from the uplink channel 56 for the second satellite 14. Similarly, the downlink channels 54, 58 are also different for the two satellites 12, 14 respectively. The distinctions can be brought about by having the channels at some combination of different frequencies, different polarizations, or different spatially-isolated beams, so long as the combination of the uplink channel 52, the downlink channel 54, the uplink channel 56 and the downlink channel 58 operate at frequencies, polarizations, and beams selected to provide isolation between the channels. Additionally, the downlinks 54, 58 may be distinct by virtue of the satellite downlink antenna directional (i.e., spatial) isolation and the user terminals 36, 38 geographical diversity, or by the use of antennas having multiple beams. For example, the uplink channel 52 could be carrying signals on a frequency of 29 GHz, the uplink channel 56 could be carrying signals on a frequency of 29.5 GHz, the downlink channel 54 could be carrying signals on a frequency of 19.5 GHz, and the downlink channel 58 could be carrying signals on a frequency of 20 GHz. Alternatively, the uplink channels 52, 56 could both be carrying signals at a frequency of 29.5 GHz, but with the channel 52 oriented with right hand circular polarization and the channel 56 oriented with left hand circular polarization, and both downlink channels 54, 58 could be carrying signals at a frequency of 29 GHz but with the channel 54 oriented with left hand circular polarization and channel 58 oriented with right hand circular polarization. Although not illustrated specifically in the figures, if the user terminals 36, 38 are located within different beam coverage areas of the two satellite antennas 18, 26 the downlink channels 54, 58 could be at the same frequency and polarization since the beam areas would not overlap and there would not be the necessity to utilize distinct channels.

If a plurality of user terminals 36 assigned to the same satellite 12 want to communicate with each other, the system routing is fairly simple. The RF signal, which in the preferred embodiment is a time division multiple access (TDMA) signal though other formats such as code division multiple access (CDMA) or frequency division multiple access (FDMA) may be used, is sent from the antenna 40 of one terminal 36 over the uplink channel 52 to the receiving antenna 16 of the satellite 12, where the. payload 32 routes the signal to the downlink antenna 18 and over the downlink channel 54 to the antenna 40 of the separate recipient terminal 36. A similar routing can occur if the user terminals which want to communicate are terminals 38 assigned to the satellite 14.

The difficulty arises as a user terminal 36 assigned to satellite 12 desires to communicate with user terminal 38 assigned to satellite 14. In the prior art, such communication could occur only if the satellites 12, 14, had intersatellite crosslinks, or by using a double bounce down from the satellite 12 through a ground station, back up to the satellite 14, and then down to the user 38. This problem has been overcome by the present invention, in that the satellite, and more particularly the downlink-antennas 18, 24, transmit their respective downlink RF signals in a beam which can be received by the terminals 36, 38 over dual channels. (For purposes of this description, signals are assumed to come out of only one beam of each antenna 18, 24. It is obvious, however, that the principles are applicable to multibeam antennas or phased array antennas, where the signals would be transmitted on a plurality of beams.) For example, the antenna 18 would transmit RF signals in two beams out of the antenna 18 that would be viewed by the user terminals 36, 38 as two channels 54, 60 each having the same frequency and polarization. Data destined for user terminal 36 would be transmitted on beam 54, and data destined for user terminal 38 would be transmitted on beam 60. Likewise, satellite 14 antenna 24 would transmit its RF signals over two beams coming out of the antenna 24 that would be viewed by the user terminals as two channels 58, 62 each having the same characteristics of frequency and polarization. Data destined for user terminal 36 would be transmitted on beam 62, and data destined for user terminal 38 would be transmitted on beam 58. The user terminal 36 would have in its RF signal processor 51 appropriate circuitry (or programming) to enable the processor to receive RF signals over both channels 54 and 62, and user terminal 38 would have in its processor 53 appropriate circuitry (or programming) to enable the processor 50 to receive RF signals over both channels 58 and 60. In this fashion, signals intended for transmission from user terminal 36 to user terminal 38 can be routed through only one satellite and directly accessed by user terminal 38 while the system avoids unnecessary delays and expense.

Figure 2:
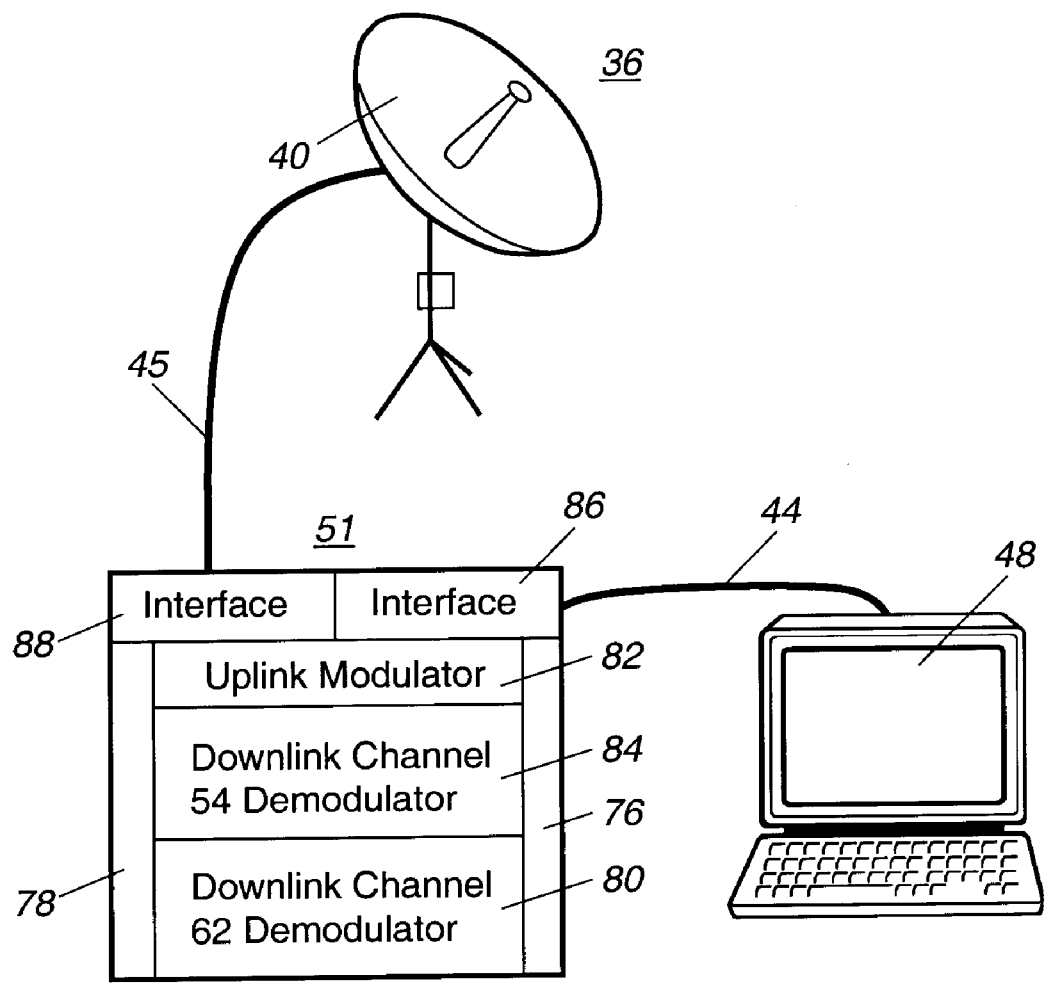
FIG. 2 is a detailed schematic illustration of the ground user terminal of the present invention.

Referring now to FIG. 2, where like reference numerals refer to like items as illustrated in FIG. 1, therein is illustrated the user terminal 36 in greater detail. The terminal, as previously described, includes a dual mode, transmit/receive antenna 40, the RF signal processor 51, and the data processor 48, connected electrically by the connecting lines 45 and 44. The RF signal processor 51 is comprised of an antenna interface 88 which allows the RF signal processor to interface to the antenna 40, and a data processor interface 86, which permits the RF signal processor 51 to interface with the data processor 48. The RF signal processor 51 further includes an uplink modulator 82, a first downlink channel demodulator 84, and a second downlink channel demodulator 80, all three of which are electrically coupled to the antenna bus 78 and the processor bus 76, which allows communications to occur between the interfaces 86, 88 and the modulators and demodulators 82, 80, 84. The modulator 82, such as that described in U.S. Pat. No. 5,692,014, receives signals from the data processor 48 through the lead 44, the interface 86 and the bus 76, reformats the data into proper form, modulates it as appropriate onto a carrier signal at a predetermined frequency, and then transfers the modulated signal through the bus 78, the interface 88 and the lead 45 to the antenna 40, where it is transmitted over channel 52 to the satellite antenna 16 at some polarization.

The downlink demodulators 80, 84, which may be modems such as that described in U.S. Pat. No. 5,692,014, each receives signals from the antenna 40 which are communicated over the lead 45 to the interface 88 and then through the bus 78 to the respective demodulator 80, 84. The signals from the antenna 40 would obviously be those received from the satellite 12 over channel 54, those from the satellite 14 over the channel 62, and any other signals that might be broadcast-from different satellites, or these satellites 12, 14 but in different beams or channels, so long as the signals are within the reception capability of the antenna 40.

The channel 54 downlink demodulator 84 is programmed (either by software or in hard wiring) to discard any signals other than those which were transmitted on channel 54, and likewise, the channel 62 downlink demodulator 80 accepts only those signals which were transmitted on channel 62. The demodulators 80, 84 demodulate, detect and decode the multiple downlinks, filter as appropriate, and output their respective data streams to the bus 76 for further transfer to the data processor 48. Appropriately, the two demodulators 80, 84 could multiplex their data streams as they were communicated to the processor 48.

Therefore, it can be seen that the present invention provides a user terminal for inclusion in a communications system that permits the siting of two satellites at the same node along the geostationary arc without requiring the intersatellite crosslinks or the inherent delays involved with a double bounce through a third earth station.

We claim:

1. A user ground terminal for use in a satellite-based communications system of the type including a first satellite with means for receiving RF signals through a first uplink channel to said first satellite and for transmitting RF signals through a first downlink channel from said first satellite distinct from said first uplink channel, and a second satellite with means for receiving RF signals through a second uplink channel to said second satellite distinct from said first uplink channel, and for transmitting RF signals through a second downlink channel distinct from said first downlink channel and said second uplink channel, said user around terminal comprising:

a user terminal antenna for receiving RF signals on said first downlink channel and said second downlink channel, and for transmitting RF signals on only one of said first and second uplink channels;

an RF signal processor electrically coupled to said user terminal antenna and processing RF signals received on said first downlink channel and said second downlink channel, said RF signal processor including means for supplying RF signals to said user terminal antenna for transmission to only one of said first satellite on said first uplink channel and said second satellite on said second uplink channel; and a data processor connected to said RF signal processor and processing data received from said RF signal processor:

whereby the user ground terminal is capable of transmitting RF signals to only one satellite, with which the user ground terminal is associated, but is capable of receiving RF signals from multiple satellites, to facilitate transmission of data between two user ground terminals associated with different satellites without the need for intersatellite crosslinks or ground relay stations.

2. The user ground terminal according claim 1 wherein said first uplink channel operates at a first frequency.

3. The user ground terminal according to claim 2 wherein said first downlink channel operates at a second frequency different from said first frequency.

4. The user ground terminal according to claim 3 wherein said second downlink channel operates at a third frequency different from said second frequency.

5. The user ground terminal according to claim 1 wherein said first uplink channel operates at a first polarization.

6. The user ground terminal according to claim 5 wherein said first downlink channel operates at a second polarization.

7. The user ground terminal according to claim 6 wherein said second downlink channel operates at a third polarization different from said second polarization.

8. The user ground terminal according to claim 1 wherein said RF signals are time division multiple access signals.

9. The user ground terminal according to claim 1 wherein said first uplink channel, said first downlink channel and said second downlink channel operate at frequencies and polarizations selected to provide isolation between said channels.

* * * * *